United States Patent
Rykowski et al.

(10) Patent No.: US 9,882,887 B2
(45) Date of Patent: Jan. 30, 2018

(54) SINGLE SIGN-ON FOR MANAGED MOBILE DEVICES

(71) Applicant: AirWatch LLC, Atlanta, GA (US)

(72) Inventors: Adam Rykowski, Alpharetta, GA (US); Ashish Jain, Los Altos, CA (US); Dale Robert Olds, Redwood City, GA (US); Emily Hong Xu, Palo Alto, CA (US); Kabir Barday, Atlanta, GA (US); Kyle Austin, Saratoga, CA (US); Sridhara Babu Kommireddy, Alpharetta, GA (US); Jonathan Blake Brannon, Mableton, GA (US); Camilo Lotero, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 0 days.

(21) Appl. No.: 14/739,980

(22) Filed: Jun. 15, 2015

(65) Prior Publication Data

US 2016/0366121 A1    Dec. 15, 2016

(51) Int. Cl.
   *H04L 29/06*    (2006.01)
(52) U.S. Cl.
   CPC ...... *H04L 63/0815* (2013.01); *H04L 63/0807* (2013.01); *H04L 63/0823* (2013.01)
(58) Field of Classification Search
   None
   See application file for complete search history.

(56) References Cited

U.S. PATENT DOCUMENTS

| | | | |
|---|---|---|---|
| 5,781,909 A * | 7/1998 | Logan | G06F 17/30882 |
| 7,788,711 B1 | 8/2010 | Sun et al. | |
| 8,850,546 B1 * | 9/2014 | Field | G06F 21/335 726/1 |
| 8,984,149 B1 | 3/2015 | Martini | |
| 2002/0078153 A1 * | 6/2002 | Chung | G06Q 10/10 709/204 |
| 2002/0133725 A1 * | 9/2002 | Roy | G06K 9/00006 726/5 |
| 2006/0206707 A1 * | 9/2006 | Kostal | G06F 21/33 713/156 |
| 2007/0028095 A1 * | 2/2007 | Allen | H04L 63/0869 713/156 |

(Continued)

FOREIGN PATENT DOCUMENTS

| | | |
|---|---|---|
| WO | 2010083889 | 7/2010 |
| WO | 2014151227 | 9/2014 |

OTHER PUBLICATIONS

Office Action dated Nov. 14, 2016 for U.S. Appl. No. 14/739,980.
(Continued)

*Primary Examiner* — Dede Zecher
*Assistant Examiner* — Richard A McCoy

(57) ABSTRACT

Disclosed are various examples for providing a single sign-on experience for managed mobile devices. A management application executed in a computing device receives a single sign-on request from a managed client application executed by the same computing device. The management application determines that the client application is permitted to access a management credential for single sign-on use. The management application provides the management credential to the client application in response to the single sign-on request.

20 Claims, 8 Drawing Sheets

(56) References Cited

U.S. PATENT DOCUMENTS

| | | |
|---|---|---|
| 2007/0157298 A1 | 7/2007 | Dingwall et al. |
| 2008/0115198 A1 | 5/2008 | Hsu et al. |
| 2008/0134049 A1 | 6/2008 | Gupta et al. |
| 2008/0263653 A1* | 10/2008 | Lee .................... H04L 63/08 726/10 |
| 2008/0301791 A1 | 12/2008 | Smith et al. |
| 2010/0082491 A1* | 4/2010 | Rosenblatt ............ G06Q 10/02 705/65 |
| 2010/0235918 A1* | 9/2010 | Mizrahi ............. H04L 63/1416 726/25 |
| 2010/0318636 A1 | 12/2010 | Matsumura et al. |
| 2012/0079569 A1 | 3/2012 | Mendelovich et al. |
| 2012/0210413 A1 | 8/2012 | Akula et al. |
| 2012/0272307 A1 | 10/2012 | Buer |
| 2012/0290336 A1* | 11/2012 | Rosenblatt ............ G06Q 30/02 705/5 |
| 2012/0291114 A1 | 11/2012 | Poliashenko et al. |
| 2013/0049928 A1* | 2/2013 | Moore .................. G07C 11/00 340/5.51 |
| 2013/0086669 A1 | 4/2013 | Sondhi et al. |
| 2013/0117831 A1* | 5/2013 | Hook .................... G06F 21/335 726/6 |
| 2013/0124756 A1* | 5/2013 | Voronel ............... H04L 63/126 709/239 |
| 2013/0276080 A1* | 10/2013 | Nakonetzki ............ H04L 63/08 726/7 |
| 2013/0290226 A1* | 10/2013 | Dokken .................. G06N 5/02 706/12 |
| 2013/0312061 A1 | 11/2013 | Casals Andreu |
| 2014/0007198 A1* | 1/2014 | Durbha ................ H04L 63/102 726/4 |
| 2014/0020078 A1 | 1/2014 | Canning et al. |
| 2014/0052548 A1* | 2/2014 | Dokken, Jr. ........... G06Q 50/01 705/14.73 |
| 2014/0082715 A1* | 3/2014 | Grajek ............... H04L 63/0815 726/8 |
| 2014/0156732 A1 | 6/2014 | Lanni et al. |
| 2014/0189841 A1 | 7/2014 | Metke et al. |
| 2014/0237236 A1 | 8/2014 | Kalinichenko |
| 2014/0245411 A1 | 8/2014 | Meng et al. |
| 2014/0279622 A1 | 9/2014 | Lamoureux et al. |
| 2014/0298348 A1 | 10/2014 | Qureshi |
| 2014/0310792 A1* | 10/2014 | Hyland ............... H04L 63/0861 726/8 |
| 2014/0376403 A1 | 12/2014 | Shao et al. |
| 2015/0046997 A1* | 2/2015 | Gupta ................ H04L 63/0272 726/7 |
| 2015/0052584 A1* | 2/2015 | Rudraraju ............ H04L 63/102 726/4 |
| 2015/0188999 A1 | 7/2015 | Manuel-Devadoss |
| 2015/0244706 A1 | 8/2015 | Grajek et al. |
| 2015/0317466 A1* | 11/2015 | Kumar .................... G06F 21/32 726/7 |
| 2015/0365405 A1 | 12/2015 | Kalinichenko |
| 2016/0077901 A1 | 3/2016 | Roth et al. |
| 2016/0119323 A1 | 4/2016 | Krishna |
| 2016/0164860 A1 | 6/2016 | Dunne et al. |
| 2016/0219060 A1* | 7/2016 | Karunakaran ........ H04L 63/102 |
| 2016/0269898 A1* | 9/2016 | Kueh .................... H04W 12/06 |
| 2016/0337344 A1 | 11/2016 | Johansson et al. |
| 2017/0032111 A1 | 2/2017 | Johansson |
| 2017/0046758 A1 | 2/2017 | Sheehan |
| 2017/0111351 A1 | 4/2017 | Grajek et al. |

OTHER PUBLICATIONS

International Search Report dated Oct. 6, 2016 for Application No. PCT/US2016/037353.
International Search Report dated Oct. 7, 2016 for Application No. PCT/US2016/037369.
Office Action dated Nov. 21, 2016 for U.S. Appl. No. 14/739,975.
Office Action dated Mar. 20, 2017 for U.S. Appl. No. 14/926,769.
Office Action dated Nov. 18, 2016 for U.S. Appl. No. 14/926,769.
Office Action dated Jun. 30, 2017 for U.S. Appl. No. 14/739,975.
Office Action dated Sep. 22, 2017 for U.S. Appl. No. 14/926,769.
Notice of Allowance dated Sep. 6, 2017 for U.S. Appl. No. 14/926,763.
Doyle et al, Ubiquitos Desktops with Multi-factor Authentication, 2008, IEEE, pp. 198-203.
Benkhelifa et al, On A Real World Implementation of Advanced Authentication Mechanism in A Multi-Tenant Cloud Service Delievery Platform, 2014, IEEE, pp. 1-6.
Office Action dated Sep. 18, 2017 for U.S. Appl. No. 14/739,983.
Office Action dated Oct. 19, 2017 for U.S. Appl. No. 14/739,972.

* cited by examiner

SINGLE SIGN-ON FOR MANAGED MOBILE DEVICES

CROSS-REFERENCE TO RELATED APPLICATIONS

This application is related to U.S. patent application entitled "SINGLE SIGN-ON FOR MANAGED MOBILE DEVICES" and filed on even date herewith under U.S. patent application Ser. No. 14/739,975 entitled "SINGLE SIGN-ON FOR UNMANAGED MOBILE DEVICES" and filed on even date herewith under U.S. patent application Ser.No. 14/739,983 entitled "SINGLE SIGN-ON FOR UNMANAGED MOBILE DEVICES" and filed on even date herewith under Ser. No. 14/739,972, which are incorporated herein by reference in their entirety.

BACKGROUND

Users may have many different accounts for a multitude of applications and services. Examples of applications and services may include social networking services, file sharing services, email services, voice communication services, office productivity services, task tracking services, and still others. A user may have to establish a corresponding username and password to authenticate for each account. This becomes a difficult and inconvenient practice where numerous accounts are involved. Accordingly, users may set weak passwords that are short or otherwise easy to remember, share passwords among multiple accounts, use third-party password managers, or engage in other practices that might be regarded as insecure.

The concept of identity federation arose as a solution to this problem. Under identity federation, a user establishes an account with a federated identity provider. To this end, the user specifies a single set of security credentials. The federated account is then linked to a multiplicity of applications and services that are provided by other organizations. When the user seeks to access applications and services that are linked to the federated account, the user can simply provide the single username, password, or other credentials of the federated account for authentication. In like manner, an organization such as an enterprise may use a directory service such as ACTIVE DIRECTORY by MICROSOFT CORPORATION in order to provide a single log-in for each of multiple applications and services of the organization.

Despite the availability of identity federation, the end user experience may still be suboptimal. Even assuming that users are able to employ a single federated account for multiple applications and services, the users may be required to enter the federated account credentials separately. For example, suppose that a user logs in with a social networking application provided by a social networking service provider that is also a federated identity provider. Subsequently, the user may want to use a file sharing application that is linked to the federated identity provider. The user may then have to supply the same username and password that was previously entered for the social networking application. Repetitively entering these security credentials for each application and service may frustrate users.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing a single sign-on experience for users of mobile devices. With a single sign-on experience, a user enters or obtains a single set of security credentials for an account and, upon authentication, the user is able to access multiple different applications and services that are linked to that account. Multi-factor authentication can also be employed where the user is required to provide a combination of knowledge, possession, or biometric authentication factors. As contemplated herein, the term "single sign-on" can include scenarios in which a user is required to re-enter security credentials due to session timeouts, inactivity periods, suspicious activities, or other events that could cause authentication of the user to be doubted.

In the context of a web browser, a single sign-on experience can be enabled by way of cookies. In response to a user logging in with a federated identity provider, a cookie can be stored on the user's device that contains a token indicating authentication. When the user later accesses another network site that supports authentication by way of the federated identity provider, the cookie is presented and the token can be exchanged for a site-specific token. Consequently, the user does not have to log in again to access the network site.

However, the single sign-on design paradigm from the browser context does not function in the context of mobile applications. Although mobile applications can invoke web views, cookies that are part of a web view invoked within a mobile application cannot be accessed in other mobile applications or by a browser. Even assuming that a user logs into a federated account by way of a first mobile application, the cookies and application tokens that indicate successful authentication are not made available to a second mobile application because they can have separate webviews. As will be described, various implementations of the present disclosure facilitate single sign-on within mobile applications and other applications that embody this limitation. Moreover, according to the present disclosure, the requirement to use a particular software development kit (SDK) for each application in order to implement single sign-on can be rendered unnecessary.

Figure 1:
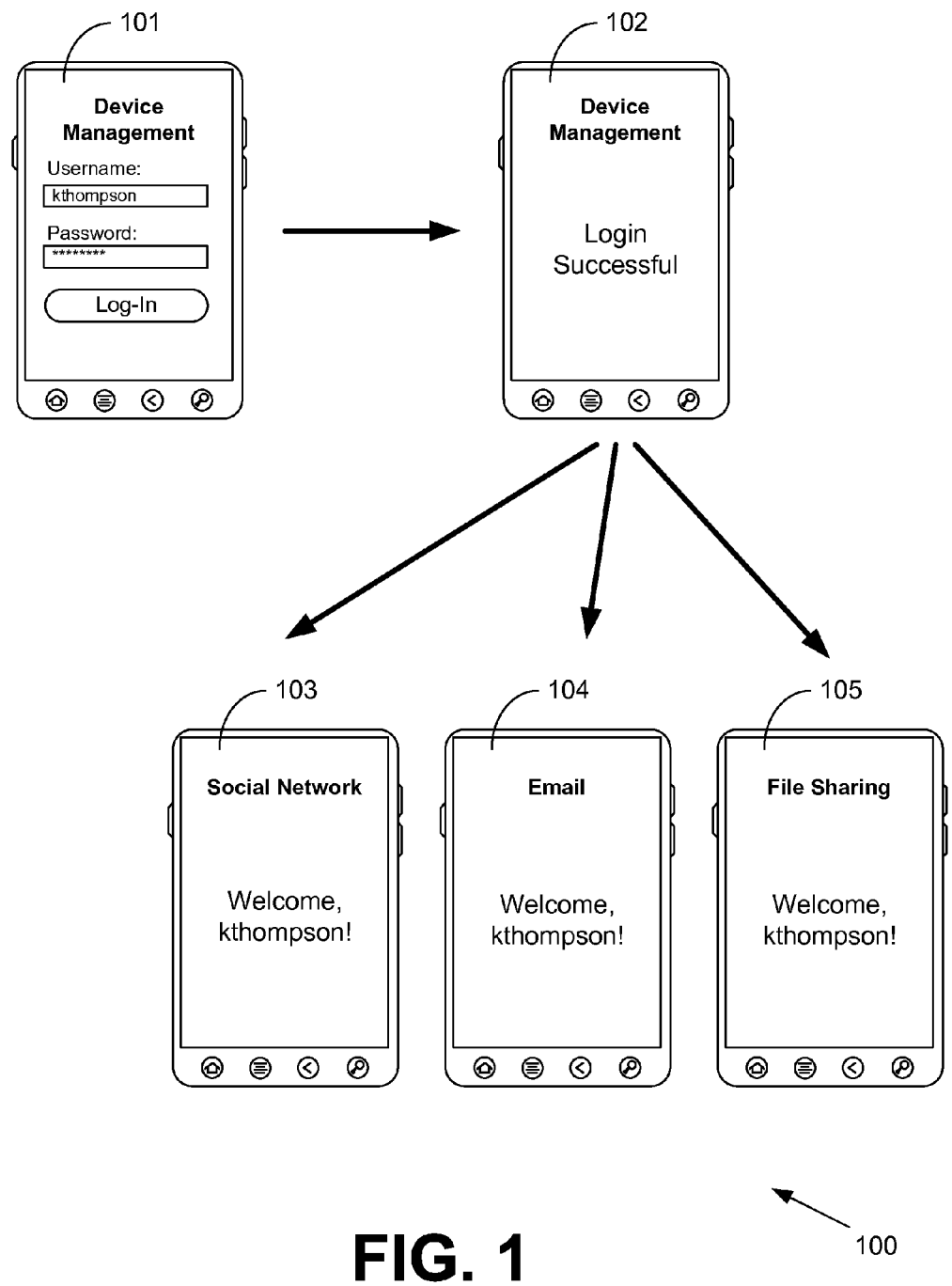
FIG. 1 is a drawing illustrating an example scenario of the disclosure.

Specifically, in the present disclosure, examples are disclosed that enable a single sign-on experience for mobile devices that are managed. With reference to FIG. 1, shown is a pictorial diagram of an example single sign-on scenario 100. At 101, a user launches a management application that can manage applications upon the user's mobile device. The management application can be a native mobile application or a web-based management application accessed from a browser. The management application renders a user interface configured to receive login information for a device management service. Specifically in this example, the user interface includes a form configured to receive a username and a password. Other security credentials or authentication factors can be elicited in other examples. After the user enters the information, the user selects a log-in entry component.

Upon entering correct log-in information, the user is authenticated, and the user interface can then be updated to indicate to the user that the log-in was successful at 102. Subsequently, the user can launch or access other managed applications on the mobile device, such as a social networking application at 103, an email application at 104, or a file sharing application 105. These applications can communicate with an external service. Because the user has already been authenticated through the device management application, these applications indicate that the user is already authenticated. Consequently, the user does not have to provide login information for the applications separately, and the user is able to use the services accessed through the respective applications.

Figure 2:
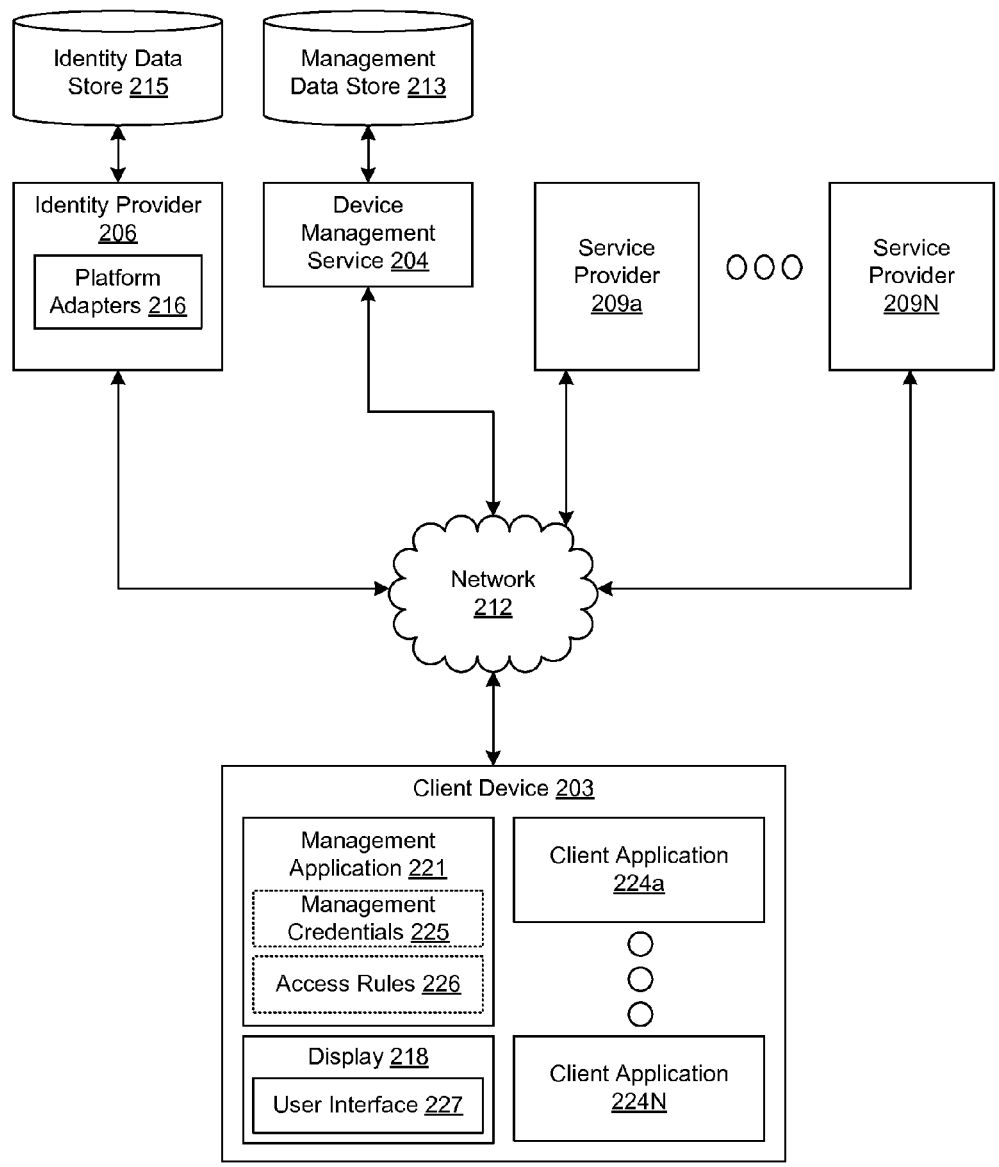
FIG. 2 is a drawing of a networked environment according to various examples of the disclosure.

With reference to FIG. 2, shown is a networked environment 200 according to various examples. The networked environment 200 includes a client device 203, a device management service 204, an identity provider 206, and a plurality of service providers 209a . . . 209N, which can be in data communication with one another over the network 212. The network 212 includes, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The device management service 204, the identity provider 206, and the service providers 209 can include, for example, a server computer or any other system providing computing capabilities. Alternatively, the device management service 204, the identity provider 206, and the service providers 209 can employ multiple computing devices that can be arranged, for example, in one or more server banks, computer banks, or other arrangements. The computing devices can be located in a single installation or can be distributed among many different geographical locations. For example, the device management service 204, the identity provider 206, and the service providers 209 can include multiple computing devices that together form a hosted computing resource, a grid computing resource, or any other distributed computing arrangement. In some cases, the device management service 204, the identity provider 206, and the service providers 209 can operate as at least a portion of an elastic computing resource where the allotted capacity of processing, network, storage, or other computing-related resources can vary over time. The device management service 204, the identity provider 206 and the service providers 209 can also include or be operated as one or more virtualized computer instances. Generally, the device management service 204, the identity provider 206 and the service providers 209 can be operated in accordance with particular security protocols such that they are considered trusted computing environments.

The device management service 204 can manage or oversee the operation of multiple client devices 203. In some examples, an enterprise, such as one or more companies or other organizations, can operate the device management service 204 to oversee or manage the operation of the client devices 203 of employees, contractors, or other users within an enterprise environment. In this sense, the client devices 203 can include managed devices that are managed by the device management service 204.

To facilitate management of client devices 203, the device management service 204 can establish a secure communications channel with the client devices 203 (e.g., a mobile device management channel, or MDM channel). The device management service 204 can establish the secure communications channel by creating a secure communication link with the client device 203. A secure communication link can be established using MDM application programming interfaces (APIs) that are provided by an operating system executed by the client device 203. In some examples, the secure communications channel can be established using a push notifications framework or notification service provided by an operating system ecosystem associated with the client device 203 that allows for communications between the device management service 204 and a client device 203 over the network 212 that are encrypted using a digital certificate.

The client device 203 can be enrolled as a managed device with the device management service 204 through APIs provided by the operating system. The enrollment process can include authentication of a user's credentials. Upon authentication of a user's credentials by the device management service 204, the client device 203, using the MDM APIs of the operating system, can enroll the client device 203 as a managed device so that various management functions can be securely performed over the secure communications channel.

Examples of management functions can include commands to erase certain data from the client device 203, commands to install certain applications or application updates, commands to lock a client device 203 or activate a display lock feature, a command to remotely perform a factory reset of the client device 203, or other management functions. Additionally, data can be securely transmitted through the secure communications channel to the client device 203 or applications executed by the client device 203.

Additionally, the operating system of the client device 203 can also provide the ability to create access-restricted storage that is associated with particular applications installed on the client device 203. Access-restricted storage can be associated with multiple applications that are installed on the client device 203 through the secure communications channel. In some scenarios, applications that are signed by a common certificate can be provided access to the access-restricted storage of each other, whereas applications that are not signed by the certificate do not have access to the access-restricted storage of other applications. Additionally, the device management service 204 can transmit data to the client device 203 over the secure communications channel that can be stored in the access-restricted storage such that it is accessible by certain applications and inaccessible to other applications that are installed on the client device 203.

The secure communications channel can be encrypted or secured using a digital certificate that is associated with the client device 203, the device management service 204, or an enterprise with which the client device 203 is associated. In one scenario, the device management service 204 can obtain a security certificate, such as a secure sockets layer (SSL) certificate, that is unique to a particular enterprise with which a client device 203 is associated. In one example, an administrator associated with the enterprise can provide a certificate to the device management service 204 using an administrator console or other functionality with which a certificate can be uploaded. The certificate can also be signed by a certificate authority, which can in some cases be operated by the device management service 204. The device management service 204 can encrypt or secure the secure communications channel using the certificate so that the secure communications channel is a secure communication link over the network 212 through which data can be sent to the client device 203.

Additionally, the device management service 204 can specify that data sent through the secure communications channel can only be accessed by certain applications installed on the client device 203. The applications that can access data sent through the secure communications channel can also be restricted in how certain data can be manipulated, viewed or handled on the client device 203. For example, an application installed on the client device 203 can be coded to restrict the ability of a user to capture, share, or otherwise remove data from the client device 203 that is received through the secure communications channel.

The device management service 204 can also facilitate ensuring that client devices 203 that are administered by the device management service 204 are operating in compliance with various compliance rules. In one scenario, the device management service 204 can issue management commands that instruct a client device 203 to take a particular action with respect to a compliance rule. For example, if a client device 203 is designated as lost or stolen, the device management service 204 can issue a command instructing the client device 203 to erase data and applications that were previously sent to the client device 203 through the secure communications channel or other communication links and otherwise stored on the client device 203. The device management service 204 can also obtain data from a third party computing environment, such as an application, a security code, authentication token, or other data. As another example, if the device management service 204 determines that a client device 203 has violated a compliance rule with respect to having unauthorized modifications or unauthorized applications installed on the client device 203, the device management service 204 can issue a command instructing the client device 203 to erase data and applications stored on the client device 203. As a further example, the device management service 204 can also issue a command instructing the client device 203 to activate a display lock of the client device 203 that requires a user to enter a personal identification number (PIN) in order to use the client device 203.

The data stored in the management data store 213 and available to the device management service 204 includes, for example, authentication data, compliance rules, device data, and potentially other data. The authentication data can include data used to verify one or more security credentials presented by a user for authentication. To this end, secure certificates can be stored and then be made available to the client device 203 that has been authenticated in order to encrypt the secure communications channel and/or for other functions.

Within the context of an enterprise, compliance rules include one or more rules that, when violated, can cause the device management service 204 to issue a management command. Compliance rules can include a list of unauthorized hardware functions, software functions, or applications that potentially pose a threat to enterprise data or to the use of enterprise applications. As noted above, if client device 203 falls out of compliance with one or more compliance rules, a management command can be transmitted to the client device 203 instructing the client device 203 to perform one or more actions specified by the compliance rule. Alternatively, a compliance rule can also reside on the client device 203, which can self-enforce compliance rules. The management data store 213 can also include user account data. User account data can include information with which a user account can be authenticated, such as user credentials. User account data can also include data such as email, contact, calendar data, documents, files or other data that is associated with a user account.

Device data can represent data stored in the management data store 213 that is associated with client devices 203 that are enrolled with the device management service 204 as managed devices. Device data can include a unique device identifier associated with the client device 203, device policies that are associated with a particular client device 203, status information associated with a particular client device 203, and other data that facilitates management of the client device 203 by the device management service 204. Device data can also include user data that is synchronized with a particular client device 203. A user account can be associated with multiple client devices 203. Different client devices 203 associated with a user account can have different user account data stored thereon. For example, a user's smartphone can have a certain number of documents or email messages stored on the device, whereas the user's laptop or tablet can have varying amounts of types of user account data stored on the device.

The identity provider 206 can provide a federated identity service on behalf of the service providers 209. To this end, the identity provider 206 can be in communication with an identity data store 215 that stores information associated with user identities. This information can include, for example, usernames, security credentials, biometric identity information, authorized client applications, unauthorized client applications, authorized client devices 203, unauthorized client devices 203, and so on. As will be described, users are able to authenticate by way of the identity provider 206 in order to access services provided by the multiple service providers 209. The identity provider 206 can include a plurality of platform adapters 216 to facilitate platform-specific authentication on different client platforms, such as IOS, ANDROID, WINDOWS, and so on.

The service providers 209 provide corresponding services for client applications. The services can include, for example, social networking services, email services, voice communication services, enterprise information management services, productivity services, game services, and so on. In some examples, one or more of the service providers 209 can authenticate users separately from the identity provider 206, thereby giving users the option to log in either with the identity provider 206 or with the service provider 209 directly.

The service providers 209 and the identity provider 206 can communicate with the client device 203 over the network 212 by way of hypertext transfer protocol (HTTP), simple object access protocol (SOAP), representational state transfer (REST), and/or other protocols.

The client device 203 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 203 can include a display 218 that includes, for example, one or more devices such as liquid crystal display (LCD) displays or other types of display devices. The client device 203 can also be equipped with networking capability or networking interfaces, including a localized networking or communication capability such as an NFC capability, RFID read and/or write capability, a microphone and/or speaker, or other localized communication capability.

The client device 203 can execute various applications, such as a management application 221, a plurality of client applications 224a . . . 224N, and other applications, services, or processes. The management application 221 can receive security credentials from a user and to authenticate with the device management service 204. Upon authentication with the device management service 204, the management application 221 is able to obtain management credentials 225, which in turn allow the client applications 224 to request identity assertions from the identity provider 206 in order to authenticate the client applications 224 with the respective service providers 209 as will be described. Although described as an application, it is understood that the management application 221 can be an integral component of an operating system of the client device 203. Also, in some scenarios, the management credentials 225 can be provisioned directly to the operating system for all client applications 224 to use. This can be performed under iOS using either a certificate profile that is installed in a managed certificate keychain or a combination of a certificate and a Kerberos profile together. Rather than being stored in the management application 221, the management credentials 225 can be stored in the operating system itself in these scenarios. Various access rules 226 can restrict which client applications 224 are permitted to use the management credentials 225 for authenticating with identity providers 206. In various implementations, the access rules 226 can be maintained and enforced by the identity provider 206.

An identity assertion in security assertion markup language (SAML), for example, contains a packet of security information that service providers 209 use to make access control decisions. SAML supports three types of statements: authentication statements, attribute statements, and authorization decision statements. Authentication statements assert to the service provider 209 that the client device 203 authenticated with the identity provider 206 at a particular time using a particular method of authentication. An attribute statement asserts that a client device 203 is associated with certain attributes. An authorization decision statement asserts that a client application 224 is permitted to perform a certain action relative to a resource offered by the service provider 209. Extensible access control markup language (XACML) and/or other languages can be employed.

The client applications 224 correspond to a variety of applications that are employed to access services provided by the service providers 209. The client applications 224 can include a web view component, whereby the client applications 224 interact with the service providers 209 to obtain network content by way of hypertext transfer protocol (HTTP) requests and responses. However, unlike a browser that is used to access various web-based applications, cookies set through one client application 224 cannot be accessed by another client application 224. The client applications 224 and the management application 221 can individually render a respective user interface 227 upon the display 218.

Figure 3:
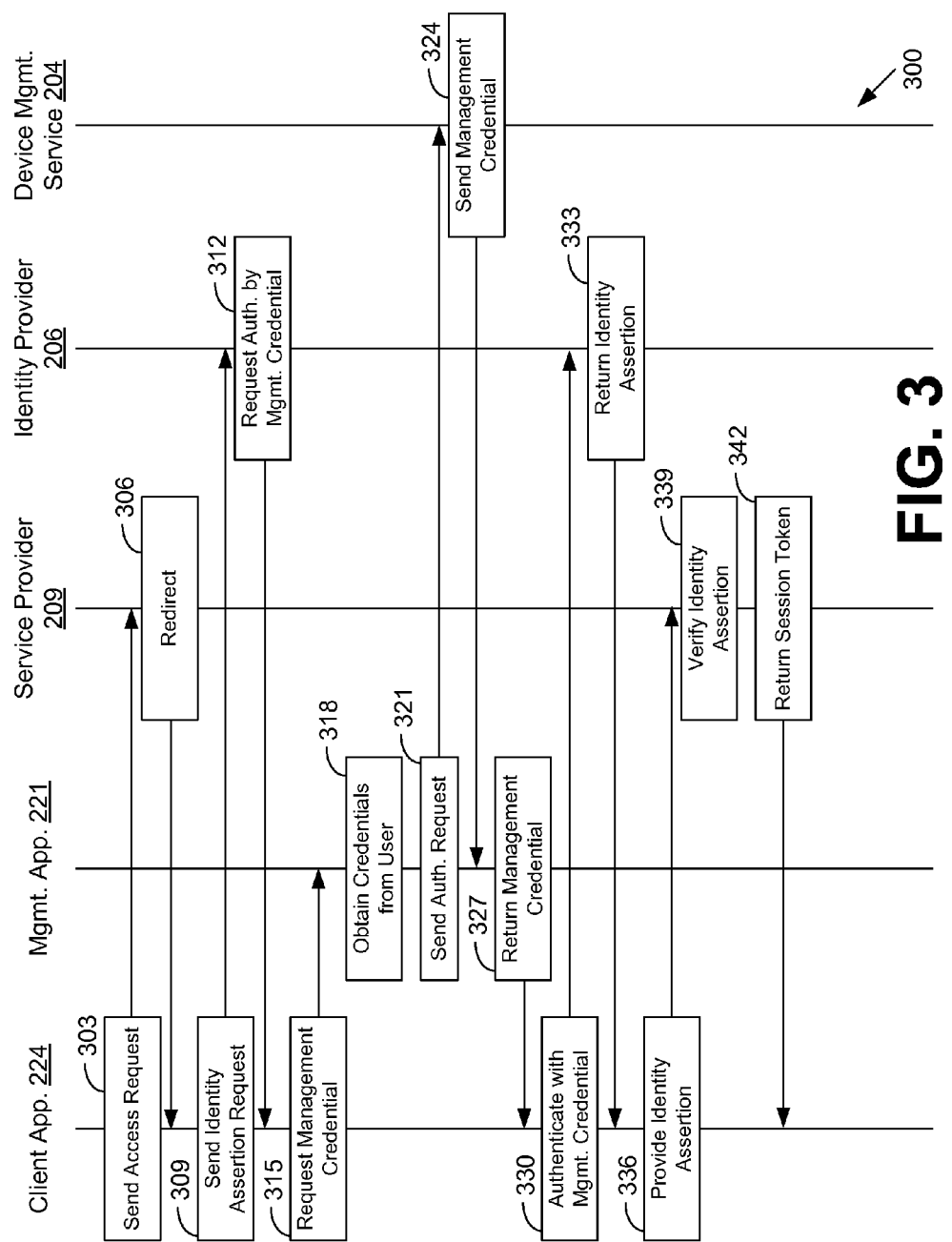
FIG. 3 is a sequence diagram illustrating an example component interaction according to various examples of the present disclosure.

Turning now to FIG. 3, shown is a sequence diagram 300 illustrating one example of interaction between the client application 224, the management application 221, the device management service 204, the service provider 209, and the identity provider 206. Functionality attributed to the client application 224, the management application 221, the device management service 204, the service provider 209, and the identity provider 206 can be implemented in a single process or application or in multiple processes or applications. The separation or segmentation of functionality as discussed herein is presented for illustrative purposes only.

Beginning with step 303, the client application 224 sends an access request to the service provider 209. At step 306, the service provider 209 sends a redirection back to the client application 224 that causes client application 224 to redirect the access request to the identity provider 206. At step 309, the client application 224 sends an identity assertion request to the identity provider 206. At step 312, the identity provider 206 detects the type of client application 224 and the platform and responds by requesting authentication by way of a management credential 225 for the specific platform. This can correspond to a certificate challenge or a Kerberos challenge. At step 315, the client application 224 requests the management credential 225 from the management application 221.

At step 318, the management application 221 obtains one or more security credentials from the user by way of a user interface 227. This step can occur upon initial launch of the management application 221, with the credentials being stored in various scenarios locally by the management application 221 or on a cloud server, such as identity data store 215, to provide a single sign-on experience for future accesses. At step 321, the management application 221 sends an authentication request to the device management service 204. The authentication request can specify the security credentials obtained from the user. At step 324, the device management service 204 sends the management credential 225 to the management application 221. At step 327, the management application 221 returns the management credential 225 to the client application 224.

At step 330, the client application 224 uses the management credential 225 to authenticate with the identity provider 206. The identity provider 206 returns the identity assertion to the client application 224 at step 333. At step 336, the client application 224 provides the identity assertion to the service provider 209. At step 339, the service provider 209 verifies the identity assertion. The service provider 209 generates a session token, such as an OAuth token, and returns the session token at step 342.

Single sign-on is thereby implemented for subsequent client applications 224 or for the client application 224 seeking to authenticate with another service provider 209. Thus, the process can repeat again for the client applications 224a . . . 224N. However, once the user is authenticated with the management application 221 for the purpose of authenticating client application 224a, the user need not enter security credentials again for authenticating client application 224b, unless perhaps due to inactivity or other events that could cause the identity of the user to be in question. Steps 315, 318, 321, 324, and 327 can be executed during the initial access to the client application 224a, but these steps can subsequently be omitted for access to the client application 224b since the management application 221 will have already obtained the management credential 225. Alternatively, the credentials can be stored by the management application 221 and automatically entered at step 318 without user input. During the single sign-on process, the user interface can remain stable to avoid "flipping" back and forth, making the process seamless to a user.

Figure 4:
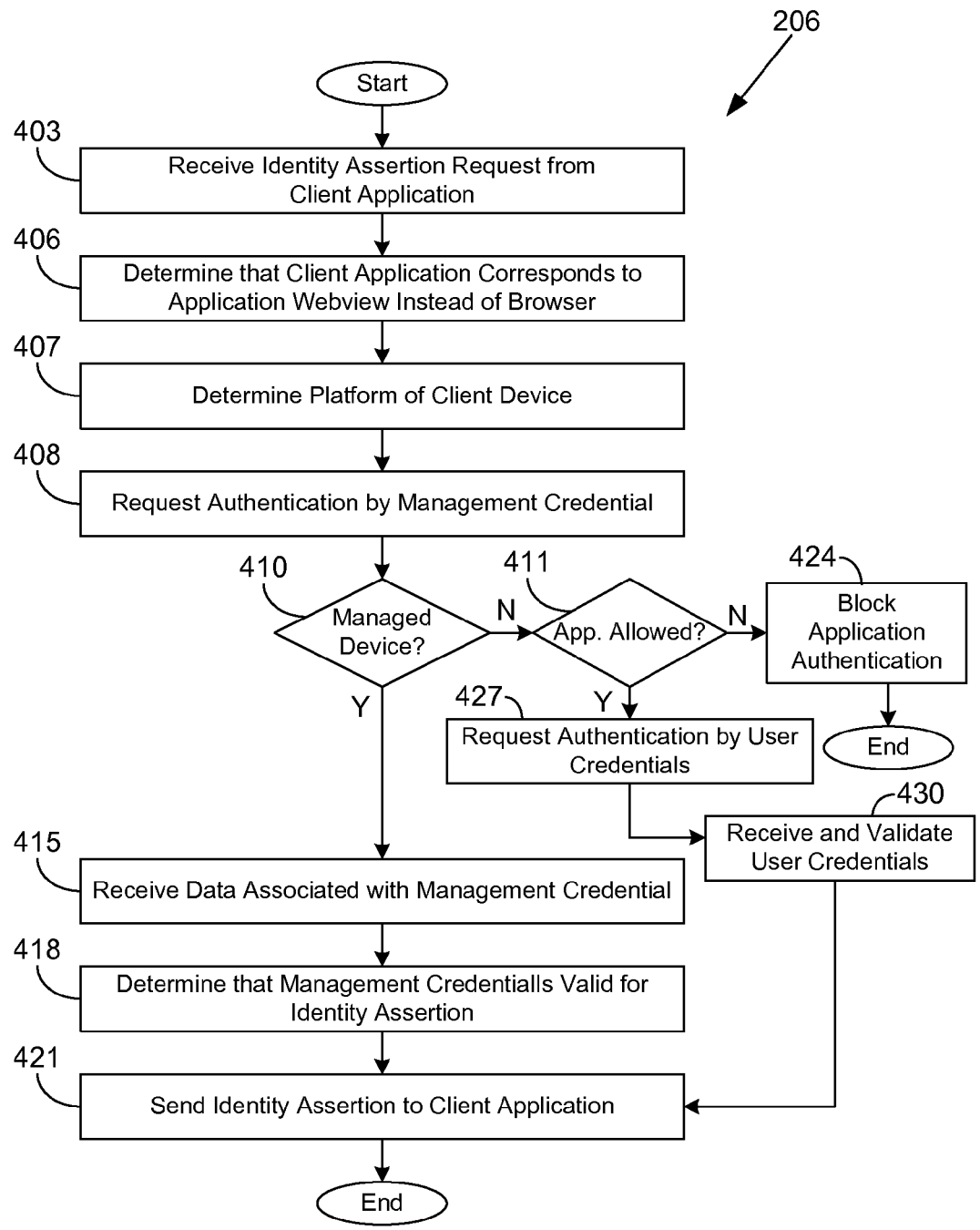
FIGS. 4-8 are flowcharts illustrating examples of functionality according to various examples of the present disclosure.

Moving on to FIG. 4, shown is a flowchart that provides one example of the operation of an identity provider 206. As an alternative, the flowchart of FIG. 4 can be viewed as depicting an example of elements of a method implemented in a computing device. Functionality attributed to the identity provider 206 can be implemented in a single process or application or in multiple processes or applications. The separation or segmentation of functionality as discussed herein is presented for illustrative purposes only.

Beginning with step 403, the identity provider 206 receives an identity assertion request from a client application 224. The client application 224 has been redirected to the identity provider 206 by a service provider 209. The redirection can be performed, for example, by way of a hypertext transfer protocol (HTTP) redirection response having status code 302. At step 406, the identity provider 206 in some scenarios can determine that the client application 224 corresponds to a mobile application web view instead of a browser. For example, the client application 224 can send a user-agent string to the identity provider 206 within an HTTP request. The user-agent string can identify whether the request originates from a specific browser or from a web view of a native application. With a browser, an alternative form of single sign-on for identity federation can be used, as cookies set by the identity provider 206 can be accessed by different service providers 209. However, with mobile applications using webviews, the cookies cannot be shared among different applications without the use of specialized software development kits (SDKs). In some cases, the identity provider 206 can be configured to deny access if the client application 224 is a browser or an unmanaged application.

At step 407, the identity provider 206 determines a platform of the client device 203. The identity provider 206 can determine the platform also by examining the user-agent string of the HTTP request. For example, the identity provider 206 can determine that the client device 203 corresponds to IOS, ANDROID, WINDOWS, BLACKBERRY, or other platforms based at least in part on corresponding identifiers contained in the user-agent string.

At step 408, the identity provider 206 requests authentication by management credential 225 based at least in part on the detected platform of the client device 203. Specifically, the identity provider 206 can request authentication using a platform-specific management credential 225 after querying a table of platforms based at least in part on information provided by the client device 203. Different types of security credentials and certificates can be used depending on the platform of the client device 203. For example, the management credential 225 can include a secure certificate, a Kerberos profile, or other credentials. Accordingly, to allow single sign-on from differing platforms, the platform adapter 216 can request the type of management credential 225 that is appropriate for the client device 203 that is requesting access. For example, when the platform is IOS, a platform adapter 216 corresponding to an IOS-specific certificate adapter or Kerberos adapter can be used, such as an esso profile. When the platform is ANDROID, a platform adapter 216 corresponding to a certificate adapter can be used. As additional examples, the OSX operating system can use a keychain, and WINDOWS 10 can use account provider credentials. The request for authentication can be performed by returning an HTTP response having status code 401, indicating that authorization is required. Further, the HTTP response can specifically request authentication by a particular protocol, such as the Kerberos protocol, through the use of a management credential 225.

At step 410, the identity provider 206 determines whether the client device 203 corresponds to a managed device. If the client device 203 is a managed device, the authentication of step 408 would complete properly. If the authentication of step 408 fails, the client device 203 can be presumed to be unmanaged. If the client device 203 does not correspond to a managed device, the identity provider 206 continues to step 411. If the client device 203 does correspond to a managed device, the identity provider 206 moves to step 412.

At step 415, the identity provider 206 receives data associated with or generated by the management credential 225. At step 418, the identity provider 206 determines that the presented management credential 225 is valid for the requested identity assertion. The identity provider 206 can verify whether the management credential 225 is permitted to be used to authenticate specific client applications 224 or for specific service providers 209. At step 421, if the management credential 225 is determined to be valid, the identity assertion is generated and sent to the client application 224. The identity assertion can include security assertion markup language (SAML), extensible access control markup language (XACML), or other data. Thereafter, the process proceeds to completion.

If, instead, the client device 203 is not a managed device, at step 411, the identity provider 206 determines whether the client application 224 is permitted to execute on an unmanaged device according to a policy. If the client application 224 is not permitted to execute on an unmanaged device, the identity provider 206 moves from step 411 to step 424 and blocks the authentication of the client application 224 and an unauthorized message may be returned. Thereafter, the process proceeds to completion.

If the client application 224 is permitted to execute on an unmanaged device, the identity provider 206 moves from step 411 to step 427, and the identity provider 206 requests authentication by user-supplied credentials, such as a username and password, biometric credentials, multi-factor credentials, and so on. At step 430, the identity provider 206 receives and validates the user-supplied credentials from the client application 224. The identity provider then moves to step 421, where the identity assertion is generated and sent to the client application 224. The identity assertion can include security assertion markup language (SAML), extensible access control markup language (XACML), or other data. Thereafter, the process proceeds to completion.

Figure 5:
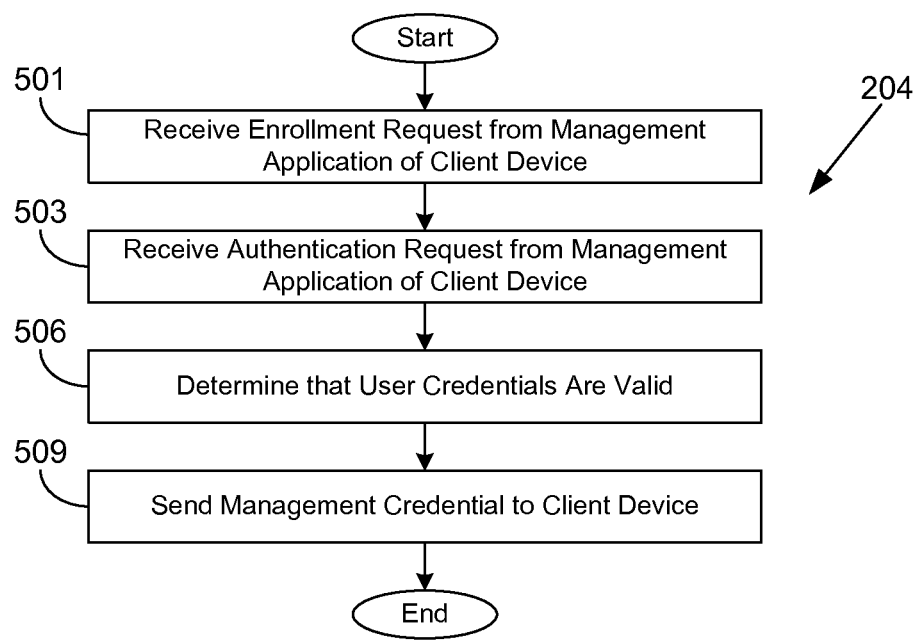

Continuing on to FIG. 5, shown is a flowchart that provides one example of the operation of a device management service 204. Functionality attributed to the device management service 204 can be implemented in a single process or application or in multiple processes or applications. The separation or segmentation of functionality as discussed herein is presented for illustrative purposes only.

Beginning with step 501, the device management service 204 receives an enrollment request from a client device 203. For example, a user can navigate to a certain uniform resource locator (URL) in a browser, the management application 221 can be installed on the client device 203, and a user can accept the terms of the enrollment. Then, a platform-specific management certificate can be sent to the management application 221. The platform-specific management certificate can be received within a profile which the client device 203 installs in a profile store as the management profile.

In step 503, the device management service 204 receives an authentication request from the management application 221 of the client device 203. The request can specify one or more security credentials, such as usernames, passwords, biometric identification, one-time passwords, and so on. At step 506, the device management service 204 determines that the security credentials that have been presented are valid. If the security credentials are not valid, an error can be generated.

At step 509, the device management service 204 sends one or more management credentials 225 to the client device 203. The management credentials 225 can be generated by a certificate authority corresponding to the device management service 204. The management credentials 225 can be employed to create a secure communications channel between the device management service 204 and the management application 221 for device management purposes. Thereafter, the process proceeds to completion.

Figure 6:
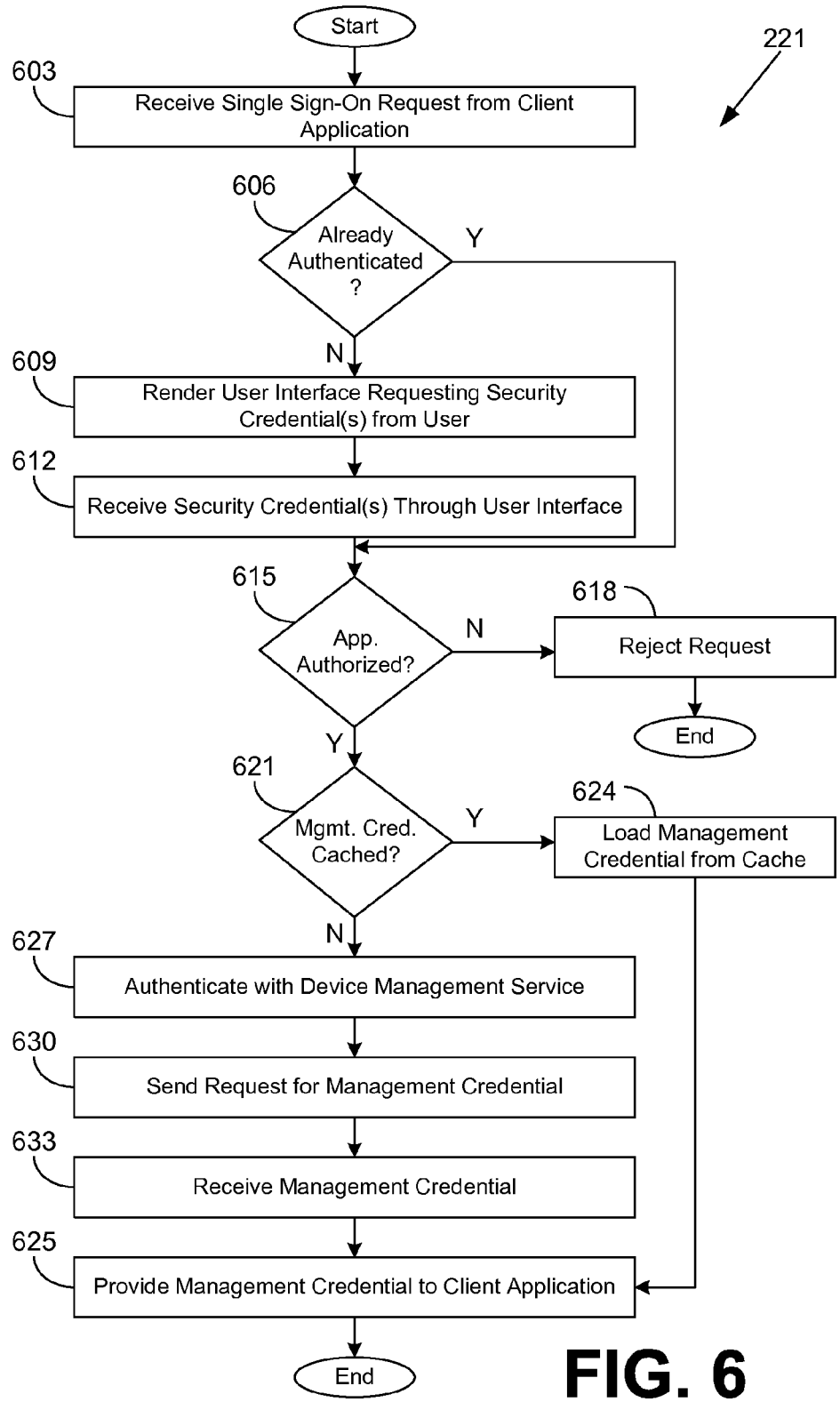

With reference to FIG. 6, shown is a flowchart that provides one example of the operation of a management application 221. Functionality attributed to the management application 221 can be implemented in a single process or application or in multiple processes or applications. The separation or segmentation of functionality as discussed herein is presented for illustrative purposes only.

Beginning with step 603, the management application 221 receives a single sign-on request from a client application 224. For example, the client application 224 can be prompted to use a management credential 225 in order to authenticate with an identity provider 206. At step 606, the management application 221 determines whether the user is already authenticated. If the user is not already authenticated, the management application 221 moves to step 609 and renders a user interface 227 on the display 218 that requests one or more security credentials from the user. At step 612, the management application 221 receives the security credentials through the user interface 227. The management application 221 continues to step 615. If the user is already authenticated by the management application 221, the management application 221 moves directly from step 606 to step 615.

At step 615, the management application 221 determines whether the client application 224 is authorized to receive the management credential 225. The management application 221 can make this determination with respect to the access rules 226 or by way of communication with the device management service 204. Examples of access rules 216 include detecting whether a device is jailbroken, uses a password of a given length or complexity, is used within a certain geographic area, has certain applications installed, has certain hardware devices (e.g., a fingerprint reader), and/or other meets other criteria relevant to the organization for whom the client device 203 is managed. If the client application 224 is not authorized, the management application 221 moves to step 618 and rejects the request. Thereafter, the process proceeds to completion.

If the client application 224 is authorized, the management application 221 moves to step 621 and determines whether the management credential 225 has been cached in the client device 203. If the management credential 225 has been cached, the management application 221 loads the management credential 225 from the cache at step 624. At step 625, the management application 221 provides the management credential 225 to the client application 224. Thereafter, the process proceeds to completion.

If the management credential 225 has not been cached, the management application 221 moves from step 621 to step 627 and authenticates with the device management service 204. To this end, the management application 221 can authenticate using the user-supplied credentials or a session or registration token. At step 630, the management application 221 sends a request for the management credential 225 to the device management service 204. At step 633, the management application 221 receives the management credential 225 from the device management service 204. At step 625, the management application 221 provides the management credential 225 to the client application 224. Thereafter, the process proceeds to completion.

Figure 7:
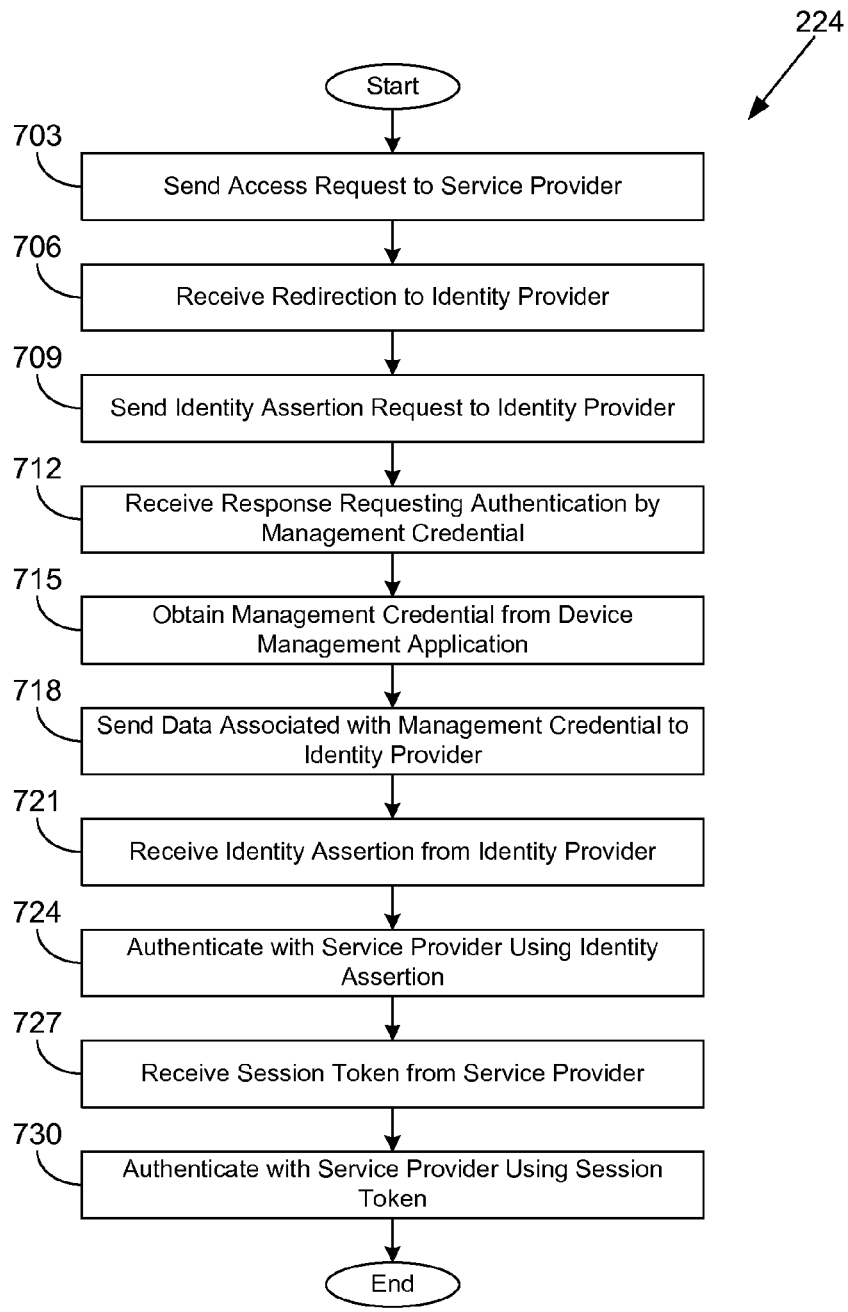

Turning now to FIG. 7, shown is a flowchart that provides one example of the operation of a client application 224. Functionality attributed to the client application 224 can be implemented in a single process or application or in multiple processes or applications. The separation or segmentation of functionality as discussed herein is presented for illustrative purposes only.

Beginning with step 703, the client application 224 sends an access request to a service provider 209. At step 706, the client application 224 receives a redirection to the identity provider 206. The redirection can include a hypertext transfer protocol (HTTP) redirection response having status code 302. At step 709, the client application 224 sends an identity assertion request to the identity provider 206. At step 712, the client application 224 receives a response requesting authentication by a management credential 225.

At step 715, the client application 224 obtains the management credential 225 from the management application 221. To this end, the client application 224 can send a request by a local uniform resource locator (URL) to the management application 221 and can also receive a response from the management application 221 by a local URL. The local URL used to invoke the management application 221 can include callback information such as a scheme name corresponding to the client application 224 so that the management application 221 can identify the client application 224 and return the requested management credential 225.

At step 718, the client application 224 sends data associated with or generated by the management credential 225 to the identity provider 206. At step 721, the client application 224 receives an identity assertion from the identity provider 206. The identity assertion can correspond to a security assertion markup language (SAML) assertion or another assertion. At step 724, the client application 224 authenticates with the service provider 209 using the identity assertion. At step 727, the client application 224 receives a session token from the service provider 209. For example, the session token can correspond to an OAuth token. Subsequently, at step 730, the client application 224 can authenticate with the service provider 209 to access resources. Thereafter, the process proceeds to completion.

Figure 8:
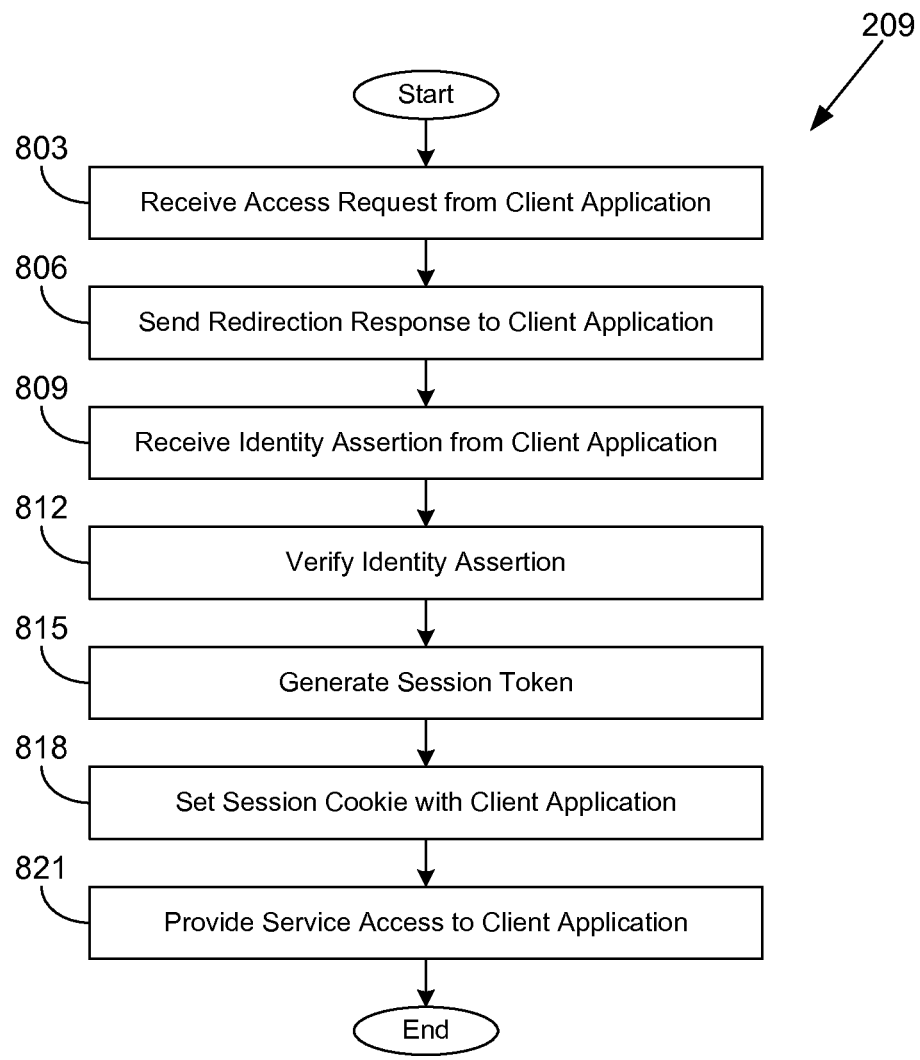

Referring next to FIG. 8, shown is a flowchart that provides one example of the operation of a service provider 209. As an alternative, the flowchart of FIG. 8 can be viewed as depicting an example of elements of a method implemented in a computing device. Functionality attributed to the service provider 209 can be implemented in a single process or application or in multiple processes or applications. The separation or segmentation of functionality as discussed herein is presented for illustrative purposes only.

Beginning with step 803, the service provider 209 receives an access request from a client application 224. The service provider 209 then correlates this access request to the use of the identity provider 206 for authentication. At step 806, the service provider 209 sends a redirection response to the client application 224. This can include a hypertext transfer protocol (HTTP) redirection response with status code 302. The redirection response can redirect the client application 224 to the identity provider 206. The redirection response can include security assertion markup language (SAML) that requests an identity assertion.

At step 809, the service provider 209 receives the identity assertion from the client application 224. At step 812, the service provider 209 verifies the identity assertion. For example, the identity assertion can include an authentication token generated by the identity provider 206, and the service provider 209 can confirm that the authentication token is authentic.

At step 815, the service provider 209 generates a session token. At step 818, the service provider 209 sets a session cookie including the session token with the client application 224. At step 821, the service provider 209 provides service access to the client application 224 based at least in part on the client application 224 presenting the session token, by way of a uniform resource locator (URL) or session cookie. Thereafter, the process can proceed to completion.

The flowcharts of FIGS. 4-8 and the sequence diagram of FIG. 3 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 203, the device management service 204, the identity provider 206, the service providers 209, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the device management service 204, the identity provider 206, the service providers 209, the management application 221, the client applications 224, and/or other components can be stored in one or more storage devices and be executable by one or more processors. Also, a data store, such as the identity data store 215 or the management data store 213 can be stored in the one or more storage devices.

The identity provider 206, the device management service 204, the service providers 209, the management application 221, the client applications 224, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program executable in a client device, the program, when executed by the client device, being configured to cause the client device to at least:
   send an access request to a service provider;
   receive a redirection from the service provider to an identity provider;
   send an identity assertion request to the identity provider based at least in part on the redirection;
   receive a response from the identity provider, the response requesting authentication by a management credential, the management credential corresponding to a secure certificate or a Kerberos profile;
   obtain the management credential from a device management application executed in the client device, wherein the device management application enforces at least one compliance rule on the client device, a device management service configures the device management application over a network to enforce the at least one compliance rule, the device management application obtains the management credential over the network from the device management service, and the device management application is in an authenticated state with the device management service in order to obtain the management credential;
   send data associated with the management credential to the identity provider;
   receive an identity assertion from the identity provider based at least in part on the data associated with the management credential; and
   authenticate with the service provider by way of the identity assertion.

2. The non-transitory computer-readable medium of claim 1, wherein the program is a native application.

3. The non-transitory computer-readable medium of claim 1, wherein the program, when executed by the client device, is further configured to cause the client device to at least request an OAuth token from the service provider using the identity assertion.

4. The non-transitory computer-readable medium of claim 1, wherein the device management application, when executed by the client device, is configured to cause the client device to at least:
   identify the program;
   determine that the program should be granted access to the management credential based at least in part on configuration data; and
   provide the management credential to the program.

5. A system, comprising:
   a computing device comprising a processor and a memory;
   a management application executable by the computing device, the management application configured to cause the computing device to at least:
      receive a single sign-on request from a client application executed by the computing device;
      determine that the client application is permitted to access a management credential for single sign-on use;
      provide the management credential to the client application; and
      wherein the management application enforces at least one compliance rule on the computing device, a device management service provider configures the management application over a network to enforce the at least one compliance rule, the management application obtains the management credential over the network from the device management service provider, and the management application is in an authenticated state with the device management service provider in order to obtain the management credential; and
   wherein the client application is configured to cause the computing device to at least:
      send an access request to a service provider;
      receive a redirection from the service provider to an identity provider;
      send an identity assertion request to the identity provider based at least in part on the redirection;
      receive a response from the identity provider, the response requesting authentication by the management credential;
      send data associated with the management credential to the identity provider;
      receive an identity assertion from the identity provider; and
      authenticate with the service provider by way of the identity assertion.

6. The system of claim 5, wherein the management application is further configured to cause the computing device to at least:
   receive another single sign-on request from another client application executed by the computing device;
   determine that the other client application is not permitted to access the management credential for single sign-on use; and
   deny access to the management credential by the other client application.

7. The system of claim 5, wherein the management application is further configured to cause the computing device to at least:
   render a user interface upon a display, the user interface being configured to receive at least one security credential from a user;
   receive the at least one security credential from the user; and
   authenticate with the device management service provider using the at least one security credential received from the user.

8. The system of claim 5, wherein the identity assertion comprises a security assertion markup language (SAML) assertion.

9. The system of claim 5, wherein the client application is further configured to cause the computing device to at least receive a session token from the service provider after authenticating.

10. A method executed in a computing device, comprising:
   sending an access request to a service provider;
   receiving a redirection from the service provider to an identity provider;
   sending an identity assertion request to the identity provider based at least in part on the redirection;
   receiving a response from the identity provider, the response requesting authentication by a management credential;
   obtaining the management credential from a device management application executed in the computing device;
   sending data generated by the management credential to the identity provider;
   receiving an identity assertion from the identity provider;
   authenticating with the service provider by way of the identity assertion; and
   wherein the device management application enforces at least one compliance rule on the computing device, a device management service provider configures the device management application over a network to enforce the at least one compliance rule, the device management application obtains the management credential over the network from the device management service provider, and the device management application is in an authenticated state with the device management service provider in order to obtain the management credential.

11. The method of claim 10, wherein the identity assertion request specifies a type of mobile device platform.

12. The method of claim 10, wherein the response from the identity provider requests Kerberos authentication, and the data generated by the management credential is sent to the identity provider by a Kerberos protocol.

13. The method of claim 10, wherein the access request is generated by a client application, and the method further comprises:
   determining that the client application is permitted access to the management credential; and
   providing the management credential to the client application.

14. The method of claim 10, further comprising:
   rendering a user interface by the device management application, the user interface configured to receive a security credential;
   receiving the security credential from a user by way of the user interface; and requesting the management credential from the device management service provider based at least in part on the security credential.

15. The method of claim 10, further comprising receiving a session token from the service provider after authenticating with the service provider by way of the identity assertion.

16. The method of claim 15, wherein the session token comprises an OAuth token.

17. The method of claim 10, wherein the identity assertion comprises a security assertion markup language (SAML) assertion.

18. The method of claim 10, further comprising:
receiving, by the device management application, a management command from the device management service provider instructing the computing device to take an action with respect to the at least one compliance rule; and
implementing, by the device management application, the action in response to the management command.

19. The method of claim 18, wherein implementing the action further comprises at least one of:
erasing data stored on the computing device;
erasing an application stored on the computing device; and
activating a display lock on the computing device.

20. The system of claim 5, wherein the response from the identity provider requests Kerberos authentication, and the data associated with the management credential is sent to the identity provider by a Kerberos protocol.

\* \* \* \* \*